May 16, 1967 N. E. MORRISON 3,320,559
ELECTRICAL CHOPPER UTILIZING A SHIELDED REED SWITCH
Filed May 17, 1965
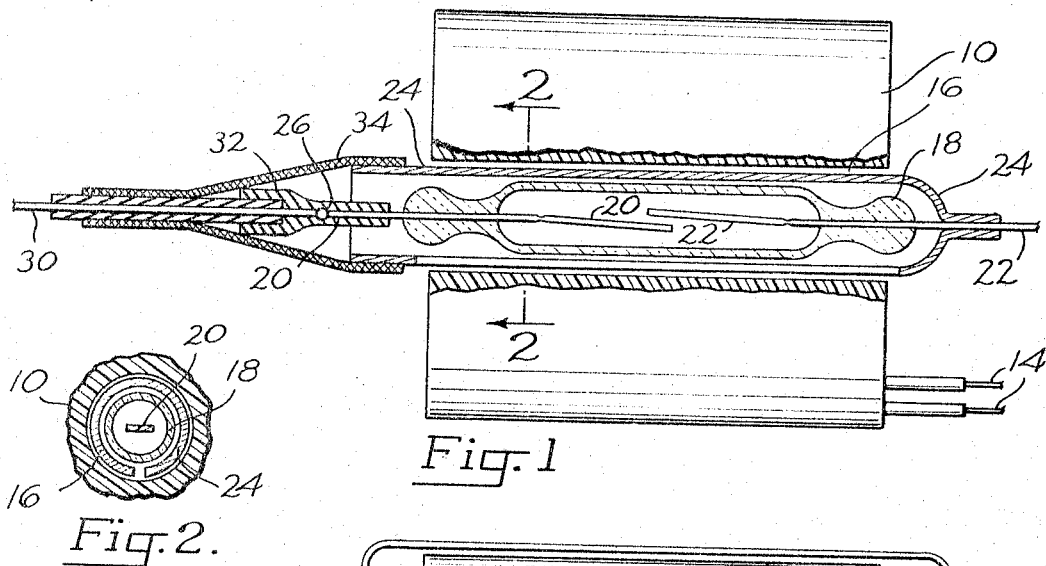
Fig. 1
Fig. 2
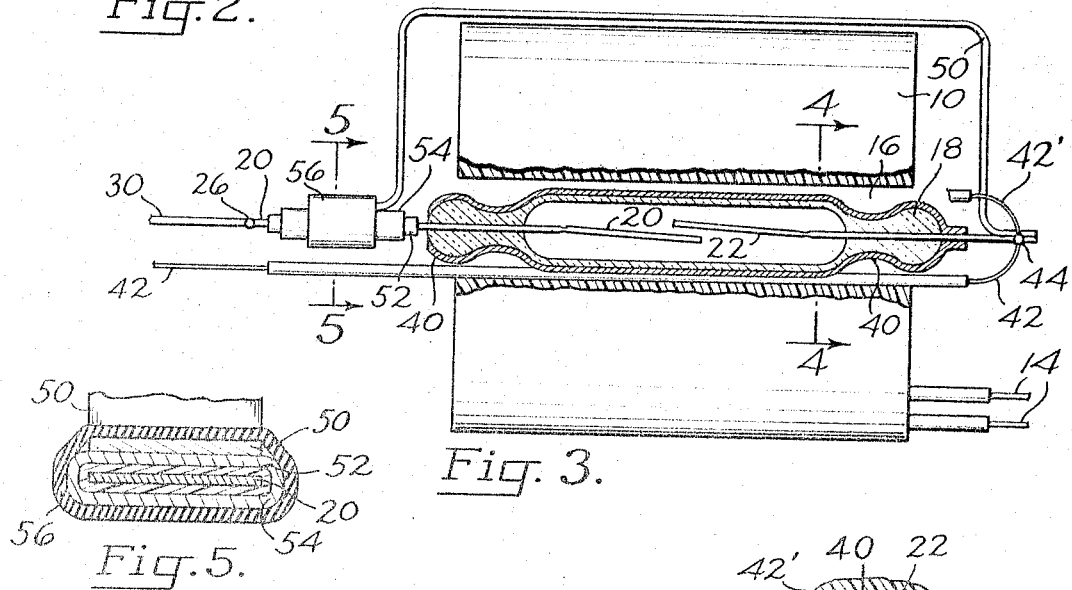
Fig. 3
Fig. 5
Fig. 4
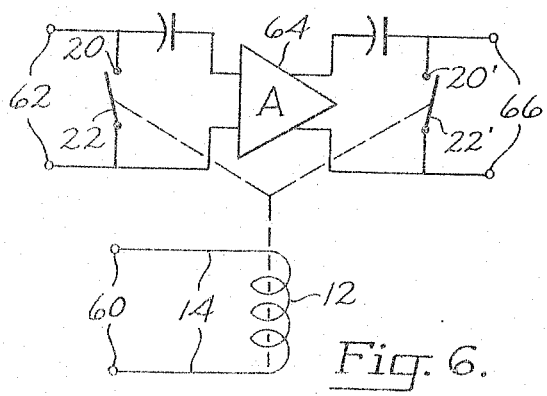
Fig. 6
Norman E. Morrison
INVENTOR
BY
Oliver D. Olson
Agent

United States Patent Office

3,320,559
Patented May 16, 1967

3,320,559
ELECTRICAL CHOPPER UTILIZING A SHIELDED REED SWITCH
Norman E. Morrison, Portland, Oreg., assignor to Electro Scientific Industries, Inc., Portland, Oreg., a corporation of Oregon
Filed May 17, 1965, Ser. No. 456,086
4 Claims. (Cl. 335—151)

This invention relates to electrical choppers, and more particularly to a novel chopper construction for use with alternating current amplifiers to detect and amplify exceedingly small direct current signals.

Electrical choppers of the class described have been provided heretofore in various forms for use as modulators and demodulators and other purposes, but have been characterized by one or more of the following deficiencies by virtue of which they have not been completely satisfactory. For example, with prior choppers of moderate cost the lower level of direct current signals which can be detected is limited by interfering signals, including those electromagnetically and electrostatically coupled from the drive coil and from external sources, as well as thermoelectric voltages generated by temperature gradients resulting from power dissipation in the drive coil. On the other hand, the choppers of the prior art in which the foregoing adverse effects have been minimized sufficiently for critical low level signal detection, are more complex and costly.

Accordingly, it is the principal object of the present invention to provide a simplified electrical chopper which is characterized by an extremely low level of stray signal interference.

Another important object of this invention is to provide an electrical chopper of the class described which operates with very low drive power, thereby extending battery life or recharging intervals in portable equipment, and minimizing thermo-electric voltages.

A further important object of the present invention is the provision of an electrical chopper which may be utilized as a modulator to convert direct current to alternating current, which may be utilized as a demodulator to convert alternating current to direct current, and which may be utilized for a variety of other purposes.

Still another important object of this invention is the provision of an electrical chopper which is of small size for convenient incorporation as a component in portable electronic equipment.

The foregoing and other objects and advantages of the present invention will appear from the following detailed description, taken in connection with the accompanying drawing in which:

FIG. 1 is an elevation, partly in section, of an electrical chopper embodying the features of the present invention;

FIG. 2 is a fragmentary sectional view taken on the line 2—2 in FIG. 1;

FIG. 3 is an elevation, similar to FIG. 1 of a second form of electrical chopper embodying the features of this invention;

FIG. 4 is a sectional view taken on the line 4—4 in FIG. 3;

FIG. 5 is a sectional view taken on the line 5—5 in FIG. 3; and

FIG. 6 is a schematic diagram, partly in block form, of an electrical circuit incorporating therein the electrical chopper of the present invention.

Referring first to the embodiment illustrated in FIGS. 1 and 2, the electrical chopper shown therein includes a conventional commercially available reed relay switch assembly which comprises a coil form 10 of electrically non-conductive material supporting the windings of an electric coil 12 (FIG. 6), the leads of which are shown at 14. Within the central opening 16 of the coil form is contained the hollow sealed envelope 18 of glass or other suitable electrically non-conductive material. The envelope is either evacuated or filled with an inert gas, such as nitrogen, and confines within it a pair of elongated blades 20 and 22 of electrically conductive material, the inner ends of which are overlapped in normally spaced relation, forming a pair of electrical contacts. The opposite ends of these blades project outwardly through the opposite ends of the envelope, where they are sealed against the passage of gases.

The blades are made of high permeability magnetic material, such as Mu metal, and at least one of them is movable resiliently toward and away from the other blade to make and break the pair of contacts, when the coil is excited intermittently. The overlapped inner ends of the blades may be coated with a gold alloy or other suitable material providing low contact resistance.

In accordance with the present invention, the foregoing reed relay switch assembly must be modified to adapt it for use as an electrical chopper for low level signals. In this regard, it is critical to the successful performance of the chopper that connection of the projecting ends of the blades to an electric circuit in which the chopper is to be used, must be made in such a manner as to minimize interfering signals.

Thus, in the embodiment illustrated in FIGS. 1 and 2, the envelope 18 is confined with an elongated tube 24 of electrically conductive, non-magnetic material, such as copper, the tube being confined within the central opening 16 in the coil form and projecting beyond the opposite ends of the latter.

One end of the tube is crimped or otherwise drawn into positive surface contact with the projecting end of the blade 22 and secured firmly in such contact by soldering or other suitable means which insures a positive electrical connection therebetween.

The opposite projecting end of the tube is open sufficiently to permit the passage outwardly therethrough of the projecting end of the other blade 20, in electrically spaced relation thereto. This projecting end of the blade is connected, as by the solder connection 26, to the central electrical conductor 30 of a coaxial cable, the connection being protected by the overlapping insulation wrapping 32. The electrically conductive outer shield 34 of the coaxial cable is secured, as by soldering, to the projecting end of the tube, to provide a positive electrical connection therebetween.

By the foregoing arrangement, the switch contact blade 20 and its associated conductor 30 are shielded from all external electrostatic fields by the tube 24 and the cable shield 34. Moreover, the current path through conductor 30 and blades 20 and 22 is coaxial with the return path through tube 24 and cable shield 34, thus minimizing magnetically induced voltages in the circuit.

It is usually desirable to minimize circulating currents in the tube 24 which otherwise would delay the change in magnetic field within the tube when the current in the coil changes, thereby delaying the opening and closing of the blade contacts. This may be achieved by splitting the tube longitudinally, as illustrated in FIGS. 1 and 2.

Referring now to the embodiment illustrated in FIGS. 3, 4 and 5, a coating 40 of electrically conductive, non-magnetic paint or other suitable material, applied directly over the outer surface of the envelope 18, replaces the electrostatic shielding function of the tube 24 in the embodiment of FIGS. 1 and 2. This coating makes contact with the projecting end of blade 22 and extends to a point adjacent the opposite end of the envelope, but is isolated electrically from the other blade 20.

The return path provided by tube 24 in FIGS. 1 and 2 is replaced by at least one, and preferably two or more electrical conductors, such as conductors 42 and 42' arranged symmetrically with respect to the longitudinal axis of the envelope 18, to minimize magnetically induced voltages in the circuit. These conductors are connected at one end, as by the solder connection 44, to the projecting end of blade 22, and are adapted to be connected at the opposite ends to an external circuit.

It will be understood that a single conductor, such as 42, may be employed if the magnetically induced voltages in such a simplified arrangement are sufficiently low for a particular application.

It will also be understood that if the shield coating 40 is of sufficiently low resistance and of adequate mechanical strength, the electrical conductors 42 and 42' may be joined to it at the left hand end thereof, as in the embodiment of FIG. 1, rather than to the projecting end of the blade 22 as illustrated.

Means also may be provided for reducing to a minimum the power required to actuate the blade contacts, by providing a low reluctance magnetic flux return path between the projecting ends of blades 20 and 22 around the outside of the coil. In the embodiment illustrated in FIGS. 3, 4 and 5 this means is provided by the elongated strip 50 of high permeability magnetic material disposed outside the coil form. One end of this strip is crimped, banded, or otherwise secured in a positive surface contact to the projecting end of the blade 22, and the opposite end is disposed substantially parallel and in closely spaced relation to the projecting end of the other blade 20. Interposed between the blade 20 and this parallel portion of the strip is a thin layer of electrical insulation material 52. The areas of the confronting surfaces of the blade and strip are large in relation to the spacing between them in order to reduce the magnetic reluctance of this gap in the magnetic flux path.

In the preferred embodiment, best illustrated in FIG. 5, the strip 52 of insulating material is wrapped completely around the projecting end portion of the blade 20, and this insulating material is covered with a thin strip of high permeability magnetic tape 54 or other suitable form of such material. This wrapping 54 effectively increases the cross sectional area of the gap, thereby further lowering the reluctance of the magnetic path and correspondingly reducing the power required in the coil. The outwardly projecting end portion of the strip 50 makes direct contact with the wrapping strip 54, and is held in firm contact therewith by such means as the outer confining band 56. This band may be of electrically conductive or non-conductive tape, banding, shrink tubing, or other material, as desired.

The strip 50 may be replaced entirely or in part by appropriate bending of an extended length of the outwardly projecting portion of blade 22. In the alternative, the high permeability magnetic strip 54 may be continued from its wrapping about the blade 20, outwardly and across the coil form 10 for attachment to the projecting end of the blade 24, thus replacing the elongated strip 50.

It is apparent that the low reluctance path may be provided by a plurality of strips 50 or by a magnetic shell surrounding the outer surface of the coil. In any event, it is by virtue of the foregoing construction that the outer ends of the pair of blades 20 and 22 are coupled together magnetically, but not electrically, to form a low reluctance magnetic loop. In this manner the magnetic force required to close the blade contacts is produced by substantially less power in the coil than is afforded without the provision of the closed magnetic loop. In this regard it has been found that the provision of this additional flux connection reduces the input power requirement to less than one-half the power required without it. Further, the power required for operation is smaller, by a factor of at least ten, than the power requirement for electrical choppers of the prior art.

The magnetic strip 50, or its alternative forms discussed above, provides the additional advantage of reducing the external magnetic field produced by the coil. Accordingly, the chopper assembly may be placed in close proximity to other electrical components and conductors in an instrument where a magnetic field would be detrimental.

It is preferred that strip 50 and at least one of the wrappings 54 and 56 be of electrically conductive material, in order to shield electrostatically the projecting end of blade 20, to provide substantially continuous electrostatic shielding around blade 20 and conductor 30, through coating 40, wrapping 54 or 56 and external shielding enclosing conductor 30.

It will be apparent that the coil form 10 may be provided with a central opening 16 of sufficient cross sectional dimension to provide space for a plurality of the central assemblies illustrated in FIGS. 1 and 3. By such an arrangement, for example, there may be provided in a package of minimum size a pair of choppers operable by a single coil and adapted for use as a modulator-demodulator, for such purposes as a direct current detector.

Thus, referring to the simplified diagram of FIG. 6 of the drawing for illustration, a pair of choppers are operatively associated, as indicated by the dotted lines, with a single coil 12. A source of pulsating or intermittent current is supplied at terminals 60 for driving the coil. The maximum frequency of operation is limited by the rate at which the chopper contacts can open and close.

One of the pair of contacts 20 and 22 of a chopper, herein used as a modulator, is connected across the input terminals 62 to which may be connected a direct current input signal to be modulated. The substantially square wave output from the modulator is applied to the input of the alternating current amplifier 64, which may be of any conventional design. After appropriate amplification, the square wave signal is applied to the contacts 20' and 22' of the second chopper, which functions as a demodulator. Since the demodulator contacts are operating in synchronism with the contacts of the modulator, the amplifier square wave is reduced to a pulsating direct current signal of the same polarity as the input signal. This direct current output, applied to the output terminals 66, may be utilized for whatever purpose desired, or it may simply be recorded visually or graphically by such means as a meter.

Still referring to FIG. 6 of the drawing, it will be apparent that a single chopper may be utilized as a modulator for a direct current input signal. After appropriate amplification of the square wave output from the modulator, the square wave signal may be utilized for whatever purpose desired. Further, it may be demodulated by use of a conventional rectifier, such as a diode, rather than by the chopper illustrated in FIG. 6.

It will be understood that the shunt connections of the choppers shown in FIG. 6 merely illustrates one of many well known ways of interconnecting the amplifier, the choppers and the input and output terminals, to form modulator and demodulator circuits. The waveform in the amplifier may be of various forms other than the square wave described hereinbefore. In the case of demodulation, the output may include alternating current components in addition to the desired direct current component.

It will be apparent to those skilled in the art that various changes may be made in the size, number and arrangement of parts and other details of construction and circuit arrangements described hereinbefore, without departing from the spirit of this invention and the scope of the appended claims.

Having now described my invention and the manner in which it may be used, what I claim as new and desire to secure by Letters Patent is:

1. An electrical chopper comprising:
(a) a hollow electric coil adapted to be activated by a source of intermittent electric current,
(b) a hollow sealed envelope within the opening of the coil,
(c) a pair of electric contacts within the envelope and projecting outwardly therefrom to opposite ends of the coil, the contacts being of magnetically permeable material and at least one being movable relative to the other contact for releasable engagement therewith under the influence of a magnetic field,
(d) non-magnetic electrical conductor means connected at one end to the projecting end of one of the contacts and extending through the coil opening toward the projecting end of the other contact,
(e) the adjacent ends of said conductor means and projecting end of said other contact being adapted for connection to an electric circuit,
(f) and a non-magnetic electrostatic shield surrounding the envelope and connected electrically to one of the electric contacts.

2. An electrical chopper comprising:
(a) a hollow electric coil adapted to be activated by a source of intermittent electric current,
(b) a hollow sealed envelope within the opening of the coil,
(c) a pair of electric contacts within the envelope and projecting outwardly therefrom to opposite ends of the coil, the contacts being of magnetically permeable material and at least one being movable relative to the other contact for releasable engagement therewith under the influence of a magnetic field, and
(d) a non-magnetic electrically conductive tube surrounding the envelope and connected at one end to the projecting end of one of the contacts and extending through the coil opening toward the projecting end of the other contact,
(e) the adjacent ends of said tube and projecting end of said other contact being adapted for connection to an electric circuit.

3. The electrical chopper of claim 2 wherein at least the portion of the tube passing through the coil is split longitudinally.

4. An electrical chopper comprising:
(a) a hollow electric coil adapted to be activated by a source of intermittent electric current,
(b) a hollow sealed envelope within the opening of the coil,
(c) a pair of electric contacts within the envelope and projecting outwardly therefrom to opposite ends of the coil, the contacts being of magnetically permeable material and at least one being movable relative to the other contact for releasable engagement therewith under the influence of a magnetic field, and
(d) a plurality of non-magnetic electrical conductors arranged symmetrically about the axis of the envelope and connected at one end to the projecting end of one of the contacts and extending through the coil opening toward the projecting end of the other contact,
(e) the adjacent ends of said conductors and projecting end of said other contact being adapted for connection to an electric circuit.

References Cited by the Examiner

UNITED STATES PATENTS

| | | | |
|---|---|---|---|
| 2,297,543 | 9/1942 | Eberhardt et al. | 330—10 X |
| 2,464,270 | 3/1949 | Spencer | 174—35 |
| 2,653,199 | 9/1953 | Brown et al. | 200—87 |
| 2,681,952 | 6/1954 | Gilbert | 330—10 |
| 2,724,022 | 11/1955 | Williams | 330—10 |
| 2,919,322 | 12/1959 | Dietrich | 200—90 |
| 2,957,961 | 10/1960 | Juptner | 200—87 |
| 3,005,069 | 10/1961 | Sippach et al. | 200—87 |

BERNARD A. GILHEANY, *Primary Examiner.*

B. DOBECK, R. N. ENVALL, JR., *Assistant Examiners.*